(12) United States Patent
Yoon et al.

(10) Patent No.: US 11,184,874 B2
(45) Date of Patent: Nov. 23, 2021

(54) METHODS AND DEVICES FOR TRANSMITTING AND RECEIVING PAGING CHANNEL IN WIRELESS COMMUNICATION SYSTEM

(71) Applicant: LG Electronics Inc., Seoul (KR)

(72) Inventors: Sukhyon Yoon, Seoul (KR); Kijun Kim, Seoul (KR); Eunsun Kim, Seoul (KR); Changhwan Park, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/615,319

(22) PCT Filed: Jun. 15, 2018

(86) PCT No.: PCT/KR2018/006775
§ 371 (c)(1),
(2) Date: Nov. 20, 2019

(87) PCT Pub. No.: WO2018/231000
PCT Pub. Date: Dec. 20, 2018

(65) Prior Publication Data
US 2020/0163047 A1    May 21, 2020

Related U.S. Application Data

(60) Provisional application No. 62/520,512, filed on Jun. 15, 2017.

(51) Int. Cl.
*H04W 68/00* (2009.01)
*H04L 1/18* (2006.01)
(Continued)

(52) U.S. Cl.
CPC ......... *H04W 68/005* (2013.01); *H04L 1/1819* (2013.01); *H04W 16/28* (2013.01); *H04W 72/042* (2013.01); *H04W 72/046* (2013.01)

(58) Field of Classification Search
CPC . H04W 68/005; H04W 16/28; H04W 72/042; H04W 72/046; H04L 1/1819
See application file for complete search history.

(56) References Cited

U.S. PATENT DOCUMENTS

| 2002/0094827 | A1* | 7/2002 | Jou | H04W 68/00 455/458 |
| 2010/0159929 | A1* | 6/2010 | Homchaudhuri | H04W 68/02 455/436 |

(Continued)

FOREIGN PATENT DOCUMENTS

| WO | 2016099138 A1 | 6/2016 |
| WO | 2016111591 A1 | 7/2016 |

(Continued)

OTHER PUBLICATIONS

CATT, "NR Paging Channel", 3GPP TSG RAN WG1 Meeting #89, May 15-19, 2017, R1-1707462.

(Continued)

*Primary Examiner* — Jael M Ulysse
(74) *Attorney, Agent, or Firm* — Dentons US LLP (57) ABSTRACT

Disclosed are methods for transmission and reception of a paging channel between user equipment (UE) and a base station in a wireless communication system. In particular, the present invention may comprise the steps of: receiving, in a paging occasion of UE, a control channel for a paging channel; attempting to receive the paging channel on the basis of downlink control information (DCI) including information indicating a retransmission time of the paging channel; and if reception of the paging channel fails, reattempting to receive the paging channel at the retransmission time indicated by the DCI.

10 Claims, 7 Drawing Sheets

(51) Int. Cl.
*H04W 16/28* (2009.01)
*H04W 72/04* (2009.01)

(56) References Cited

U.S. PATENT DOCUMENTS

| | | | | | |
|---|---|---|---|---|---|
| 2010/0279715 | A1* | 11/2010 | Alanara | | H04W 68/02 |
| | | | | | 455/458 |
| 2012/0076085 | A1* | 3/2012 | Chou | | H04W 68/00 |
| | | | | | 370/329 |
| 2012/0300655 | A1* | 11/2012 | Lee | | H04W 52/0216 |
| | | | | | 370/252 |
| 2014/0133430 | A1* | 5/2014 | Yang | | H04L 5/0055 |
| | | | | | 370/329 |
| 2015/0036658 | A1* | 2/2015 | Mochizuki | | H04W 48/16 |
| | | | | | 370/331 |
| 2015/0126235 | A1* | 5/2015 | Cho | | H04W 68/005 |
| | | | | | 455/458 |
| 2015/0156743 | A1* | 6/2015 | Lee | | H04W 8/005 |
| | | | | | 455/426.1 |
| 2015/0173039 | A1* | 6/2015 | Rune | | H04W 52/0216 |
| | | | | | 370/311 |
| 2015/0208361 | A1* | 7/2015 | Kim | | H04W 52/242 |
| | | | | | 455/522 |
| 2015/0327155 | A1* | 11/2015 | Lee | | H04W 48/12 |
| | | | | | 370/329 |
| 2015/0365914 | A1* | 12/2015 | Yu | | H04W 16/14 |
| | | | | | 455/458 |
| 2016/0029343 | A1* | 1/2016 | Quan | | H04W 28/18 |
| | | | | | 455/458 |
| 2016/0119895 | A1* | 4/2016 | Agiwal | | H04W 68/02 |
| | | | | | 455/458 |
| 2017/0099649 | A1* | 4/2017 | Vos | | H04W 68/005 |
| 2017/0273078 | A1* | 9/2017 | Alvarino | | H04W 68/00 |
| 2017/0353947 | A1* | 12/2017 | Ang | | H04L 5/0055 |
| 2017/0353974 | A1* | 12/2017 | Rupanagudi Venkata | | |
| | | | | | H04W 48/12 |
| 2017/0374644 | A1 | 12/2017 | Ryu et al. | | |

FOREIGN PATENT DOCUMENTS

| | | |
|---|---|---|
| WO | 2017048042 A1 | 3/2017 |
| WO | 2017075713 A1 | 5/2017 |
| WO | 2017160440 A1 | 9/2017 |

OTHER PUBLICATIONS

LG Electronics, "Paging design in NR", 3GPP TSG RAN WG1 Meeting #89, May 15-19, 2017, R1-1707592.

* cited by examiner

METHODS AND DEVICES FOR TRANSMITTING AND RECEIVING PAGING CHANNEL IN WIRELESS COMMUNICATION SYSTEM

This application is the National Stage filing under 35 U.S.C. 371 of International Application No. PCT/KR2018/006775, filed on Jun. 15, 2018, which claims the benefit of U.S. Provisional Application No. 62/520,512 filed on Jun. 15, 2017, the contents of which are all hereby incorporated by reference herein in their entirety.

TECHNICAL FIELD

The present disclosure relates to a wireless communication system, and more particularly, to a method and apparatus for transceiving a paging channel.

BACKGROUND ART

The necessity for mobile broadband communication much improved than the conventional radio access technology (RAT) has increased as a number of communication devices have required higher communication capacity. In addition, massive machine type communications (MTC) capable of providing various services anytime and anywhere by connecting a number of devices or things to each other has been considered as a main issue in the next generation communications.

Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed.

DETAILED DESCRIPTION OF THE DISCLOSURE

Technical Tasks

In a wireless communication system that provides beamforming and beam sweeping, in order to enhance the coverage of a paging channel, a method of retransmitting a paging channel is required.

Moreover, when a paging channel is retransmitted, in order not to restrict scheduling flexibility, a method of indicating a retransmission timing point of the paging channel through Downlink Control Information (DCI) is required.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In one technical aspect of the present disclosure, provided herein is a method of receiving a paging channel by a User Equipment (UE) in a wireless communication system, the method including receiving a control channel for the paging channel on a paging occasion of the UE, attempting a reception of the paging channel based on a Downlink Control Information (DCI) including an information indicating a retransmission occasion of the paging channel, and reattempting the reception of the paging channel on the retransmission occasion indicated by the DCI if failing in the reception of the paging channel.

In another technical aspect of the present disclosure, provided herein is a method of transmitting a paging channel to a User Equipment (UE) by a base station in a wireless communication system, the method including transmitting a control channel for the paging channel on a paging occasion of the UE, transmitting a Downlink Control Information (DCI) including an information indicating a retransmission occasion of the paging channel and the paging channel, and retransmitting the paging channel on the retransmission occasion indicated by the DCI.

In another technical aspect of the present disclosure, provided herein is a User Equipment (UE) receiving a paging channel in a wireless communication system, the UE including a transceiver and a processor controlling the transceiver to receive a control channel for the paging channel on a paging occasion of the UE, attempt a reception of the paging channel based on a Downlink Control Information (DCI) including an information indicating a retransmission occasion of the paging channel, and reattempt the reception of the paging channel on the retransmission occasion indicated by the DCI if failing in the reception of the paging channel.

In another technical aspect of the present disclosure, provided herein is a base station transmitting a paging channel to a User Equipment (UE) in a wireless communication system, the base station including a transceiver and a processor controlling the transceiver to transmit a control channel for the paging channel on a paging occasion of the UE, transmit a Downlink Control Information (DCI) including an information indicating a retransmission occasion of the paging channel and the paging channel, and retransmit the paging channel on the retransmission occasion indicated by the DCI.

Advantageous Effects

According to the present disclosure, by retransmitting a paging channel in a wireless communication system providing beamforming and beam sweeping, the coverage of the paging channel can be enhanced.

According to the present disclosure, by indicating a retransmission timing point of a paging channel through DCI, a scheduling flexibility of a base station can be improved.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR DISCLOSURE

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

Specific terms detailed description includes specific terms in order to provide a thorough understanding of the present disclosure. However, it will be apparent to those skilled in the art that the specific terms may be replaced with other terms without departing the technical spirit and scope of the present disclosure.

Detailed description disclosed together with the accompanying drawings is intended to explain not a unique embodiment of the present disclosure but an exemplary embodiment of the present disclosure.

Although the terms used in the present disclosure are selected from generally known and used terms, terms used herein may be varied depending on operator's intention or customs in the art, appearance of new technology, or the like. In addition, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meanings of each term lying within.

The embodiments of the present disclosure described below are combinations of elements and features of the present disclosure in specific forms. The elements or features may be considered selective unless otherwise mentioned. Each element or feature may be implemented without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

First of all, terminologies used in the present specification may be defined as follows.

In the present disclosure, a User Equipment (UE) may be fixed or have mobility. Various devices configured to transceive user data and/or various kinds of control information by communicating with a Base Station (BS) belong to the UE. The UE may be referred to as one of Terminal Equipment, Mobile Station (MS), Mobile Terminal (MT), User Terminal (UT), Subscribe Station (SS), wireless device, Personal Digital Assistant (PDA), wireless modem, handheld device, etc.

Moreover, in the present disclosure, a base station generally means a fixed station communicating with a UE and/or other base stations and exchanges various kinds of data and control information by communicating with the UE and/or other base stations. The BS may be referred to as other terms such as Advanced Base Station (ABS), Node-B (NB), evolved-NodeB (eNB), Base Transceiver System (BTS), Access Point, Processing Server (PS), etc. Particularly, a BS of UTRAN, a BS of E-UTRAN and a BS of a new radio access technology network may be referred to as Node-B, eNB and a gNB, respectively.

Techniques, devices and systems described in the following are applicable to various wireless multiple access systems. For example, multiple access systems may include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system, multi carrier frequency division multiple access (MC-FDMA) system, and so on.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. For clarity, the following description may be explained on the assumption of a case that the present disclosure is applied to 3GPP-based communication systems such as LTE/LTE-A system and New Radio Access Technology (NR) system. Yet, the technical features of the present disclosure are non-limited by the 3GPP based communication system. For example, although a mobile communication system is explained based on a 3GPP based communication system, the following detailed description is applicable to any other mobile communication systems except some features unique to 3GPP LTE/LTE-A/NR.

The 3GPP based communication standard defines downlink physical channels corresponding to resource elements carrying information originating from an upper layer and downlink physical channels corresponding to resource elements failing to carry information originating from the upper layer despite being used by a physical layer. For example, Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH) and Physical Hybrid ARQ Indicator Channel (PHICH) are defined, and a resource signal and a synchronization signal are defined as downlink physical signals.

A Reference Signal (RS) means a signal of a predefined special waveform known to both a gNB and a UE and may be referred to as a pilot. For example, a cell-specific RS, a UE-specific RS (UE-RS), a positioning RS (PRS) and a Channel State Information-R (CSI-RS) are defined as downlink reference signals.

The 3GPP LTE/LTE-A standard defines uplink physical channels corresponding to resource elements carrying information originating from an upper layer and uplink physical channels corresponding to resource elements failing to carry information originating from the upper layer despite being used by a physical layer. For example, Physical Uplink Shared Channel (PUSCH), Physical Uplink Control Channel (PUCCH) and Physical Random Access Channel (PRACH) are defined as uplink physical channels, and Demodulation Reference Signal (DMRS) for an uplink control/data signal and Sounding Reference Signal (SRS) used for uplink channel measurement are defined.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals.

In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

For prescribed terms and techniques, which are not described in detail among terms and techniques used in the present disclosure, the 3GPP LTE/LTE-A standard documents, e.g., 3GPP TS 36.211, 3GPP TS 36.212, 3GPP TS 36.213, 3GPP TS 36.321, 3GPP TS 36.331, etc. and the 3GPP NR standard documents, e.g., 3GPP TS 38.211, 3GPP TS 38.212, 3GPP 38.213, 3GPP 38.214, 3GPP 38.215, 3GPP TS 38.321, 3GPP TS 38.331 etc. may be referred to.

Figure 1:
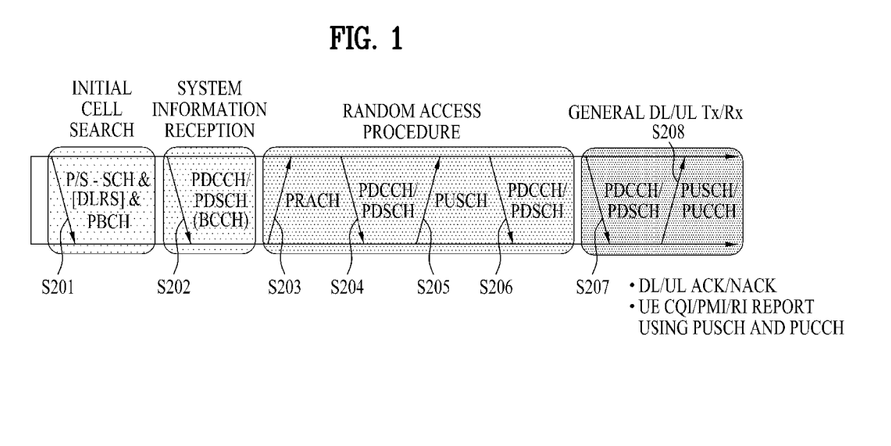
FIG. 1 is a diagram illustrating physical channels used in a 3GPP system and a general signal transmission method using the same.

FIG. 1 is a diagram illustrating physical channels used in a 3GPP system and a general signal transmission method using the same.

When power is turned on or the UE enters a new cell, the UE performs an initial cell search procedure such as acquisition of synchronization with an eNB (S201). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S202).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S203 and S205) and receive a response message to the preamble through the PDCCH and the PDSCH associated with the PDCCH (S204 and S206). In the case of a contention-based random access procedure, the UE may additionally perform a contention resolution procedure.

After performing the above procedures, the UE may receive a PDCCH/PDSCH (S207) and transmit a physical uplink shared channel (PUSCH)/physical uplink control channel (PUCCH) (S208), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

As more communication devices have demanded higher communication capacity, there has been necessity of enhanced radio broadband communication relative to legacy radio access technology (RAT). In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In 3GPP, the study on a next generation mobile communication system after EPC is in progress. And, the next generation mobile communication system after EPC may be referred to as a New RAT (NR) system, a 5G RAT system, a 5G system, or the like. For clarity, in the following description, it shall be referred to as the NR system.

In aspects of data rate, capacity, latency, energy consumption and costs, the NR system is required to support performance better than that of the existing 4G system. Hence, the NR system needs to accomplish considerable advance in the fields of bandwidth, spectral, energy, signaling efficiency and per-bit cost.

The NR system uses the OFDM transmission scheme or a transmission scheme similar thereto. The NR system may follow OFDM parameters different from OFDM parameters of the LTE system. Or, the NR system may have a system bandwidth (e.g., 100 MHz) wider than that of the existing LTE/LTE-A while exactly following the numerology of the existing LTE/LTE-A. Moreover, in the NR system, a single cell may support a plurality of numerologies. Namely, in the NR system, UEs operating according to different numerologies may coexist within a single cell.

A radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index). TTI means an interval for scheduling data therein. For example, in the current LTE/LTE-A system, a transmission opportunity of a UL or DL grant exists in each 1 ms and the UL/DL grant opportunity does not exist several times within a time shorter than 1 ms. Therefore, in the existing LTE/LTE-A system, TTI is 1 ms.

Figure 2:
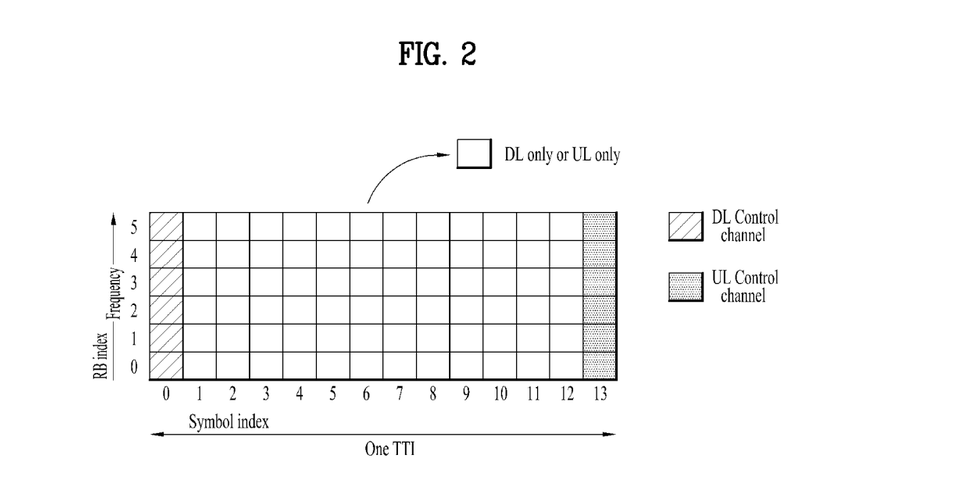
FIG. 2 shows an exemplary slot structure usable for a New Radio access technology (NR).

FIG. 2 shows an exemplary slot structure usable for a New Radio access technology (NR).

In order to minimize the delay of data transmission, the NR system considers a slot structure in which a control channel and a data channel are TDMed (time-division-multiplexed).

In FIG. 2, a hatched region indicates a transmission region of a DL control channel (e.g., PDCCH) for delivering DCI and a dark part indicates a transmission region of a UL control channel (e.g., PUCCH) for delivering UCI. Here, the DCI is control information delivered to a UE from a gNB and may include information on a cell configuration a UE should know, DL-specific information such as DL scheduling and the like, UL-specific information such as a UL grant and the like, etc. The UCI is control information delivered to a gNB from a UE and may include HARQ ACK/NACK report on DL data, CSI report on a DL channel state, a Scheduling Request (SR), etc.

In FIG. 2, symbol regions ranging from a symbol index 1 to a symbol index 12 may be used for transmission of a physical channel (e.g., PDSCH) for delivering DL data or used for transmission of a physical channel (e.g., PUSCH) for carrying UL data. Referring to FIG. 2, DL transmission and UL transmission are sequentially progressed within a single slot, and transmission/reception of DL data and reception/transmission of UL ACK/NACK on DL data may be performed within a single slot. Hence, if an error occurs in a data transmission process, a time taken to data retransmission is decreased, whereby delay may be minimized until final data is delivered.

In the slot structure shown in FIG. 2, a time gap is necessary in order that a gNB and a UE switch to a reception mode from a transmission mode, and vice versa. For the switching between the transmission ode and the reception mode, some OFDM symbol(s) of the timing of switching DL to UL in the slot structure may be configured as a Guard Period (GP).

In the NR system, a basic transmission unit is a slot. A slot duration may be configured with 14 symbols having a normal Cyclic Prefix (CP) or 12 symbols having an extended CP. And, a slot is a function of a used subcarrier spacing and scaled by a time.

The recently discussed NR system considers a scheme of using a ultrahigh frequency band (e.g., frequency band over 6 GHz) in order to transmit data to a multitude of users while maintain a high transmission rate using a wide frequency band. Yet, since the ultrahigh frequency band uses a too high frequency band, it is characterized in that signal attenuation due to a distance appears very rapidly. Therefore, in order to compensate for the rapid propagation attenuation characteristic, the NR system, which uses a frequency band over 6 GHz, uses a narrow beam transmission method of transmitting a signal by gathering energy not in omni-direction but in a specific direction. The NR system uses the narrow beam transmission method, thereby solving a problem of reduction of the coverage due to the rapid propagation attenuation. Yet, in case of providing a service using a single narrow beam only, a range for a single BS to provide a service is narrowed. Therefore, a BS may provide a service on broadband by gathering a multitude of narrow beams.

Since a wavelength is shortened on a ultrahigh frequency band, i.e., a millimeter Wave (mmW) band, a plurality of antenna elements may be installed in the same area. For example, in case of 30-GHz band having a wavelength of about 1 cm, total 100 antenna elements may be installed in 5 cm×5 cm panel with an 0.5-lamda interval in form of a 2-dimensional array. Hence, on the mmW band, a method of increasing a coverage using a plurality of antenna elements or raising a throughput is considered.

As a method of forming a narrow beam on a mmW band, a beamforming scheme, which increases energy in a specific direction only in a manner that a BS or UE transmits the same signal through a plurality of antennas using an appropriate phase difference, is mainly considered. The beamforming scheme may include a digital beamforming of generating a phase difference in a digital baseband signal, an analog beamforming of generating a phase difference in a modulated analog signal using a time delay (i.e., a cyclic shift), a hybrid beamforming using both a digital beamforming and an analog beamforming, etc. If a Transceiver Unit (TXRU) is provided to enable transmission poser and phase adjustment per antenna element, an independent beamforming per frequency resource is possible. Yet, if TXRUs are installed at all the 100 antenna elements, it may be less efficient in aspect of costs. Namely, the mmW band uses a number of antennas to compensate for the rapid propagation attenuation characteristic, and the digital beamforming needs an RF component (e.g., a digital-to-analog converter (DAC), a mixer, a power amplifier, a linear amplifier, etc.) per antenna. Hence, in order to implement a digital beamforming on a mmW band, there is a problem that the price of a communication device increases. Hence, in case that many antennas are required like the mmW band, the use of the analog or hybrid beamforming scheme is considered. According to the analog beamforming scheme, a plurality of antenna elements are mapped to a single TXRU and a direction of a beam is adjusted by an analog phase shifter. Yet, as the analog beamforming scheme can generate a single beam direction only on the full band, it is disadvantageously incapable of providing a frequency selective BeamForming (BF). The hybrid beamforming scheme has an intermediate form between the digital beamforming scheme and the analog beamforming scheme and includes a scheme of having B TXRUs (where B is smaller than Q)

when there are Q antenna elements. According to the hybrid beamforming scheme, although there is a difference according to the connection ways between Q antenna elements and B TXRUs, directions of simultaneously transmittable beams are limited to be equal to or smaller than B.

Figure 3:
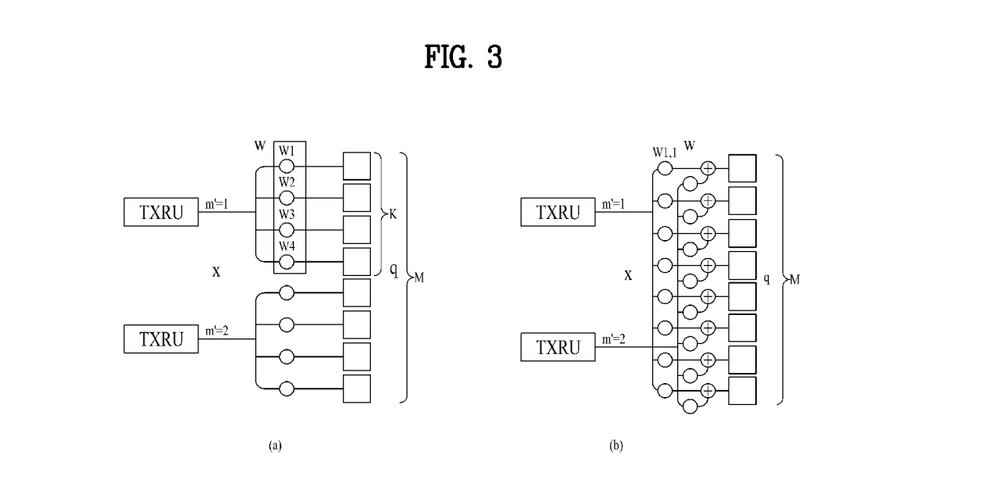
FIG. 3 illustrates exemplary connection schemes between TXRUs and antenna elements.

FIG. 3 illustrates exemplary connection schemes between TXRUs and antenna elements.

(a) of FIG. 3 illustrates connection between a TXRU and a sub-array. In this case, an antenna element is connected only to one TXRU. In contrast, (b) of FIG. 3 illustrates connection between a TXRU and all antenna elements. In this case, an antenna element is connected to all TXRUs. In FIG. 3, W represents a phase vector subjected to multiplication in an analog phase shifter. That is, a direction of analog BF is determined by W. Herein, CSI-RS antenna ports may be mapped to TXRUs in a one-to-one or one-to-many correspondence.

As described above, since the digital beamforming performs signal processing on a digital baseband signal to transmit or a received digital baseband signal, it can transmit or receive a signal in several directions using multiple beams. On the other hand, since the analog beamforming performs a beamforming in a state that an analog signal to transmit or a received analog signal is modulated, it cannot transmit or receive a signal simultaneously in multiple directions exceeding a range covered by a signal beam. Normally, a BS performs communication with a multitude of users using a wideband transmission or a multi-antenna characteristic. When a BS uses an analog or hybrid beamforming and forms an analog beam in one beam direction, it has no choice but to communicate with users included in the same analog beam direction only due to the properties of the analog beamforming. The RACH resource allocation and the resource utilization scheme of a base station according to the present disclosure, which will be described alter, are proposed by reflecting the restrictions generated due to the analog or hybrid beamforming property.

Figure 4:
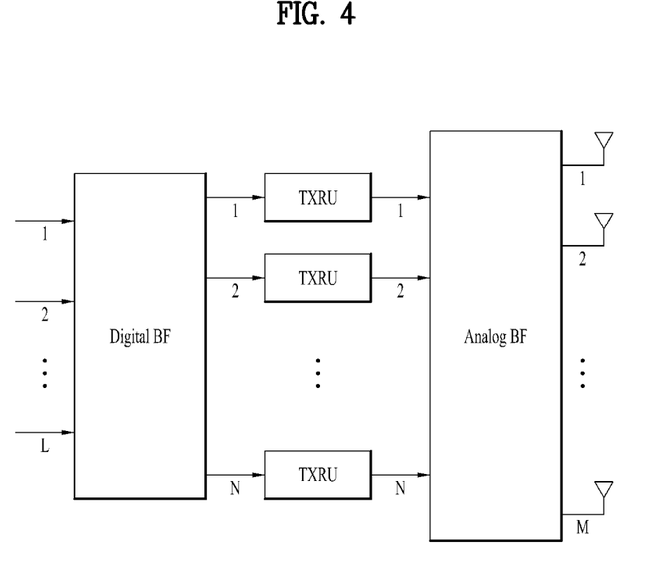
FIG. 4 abstractly shows a hybrid beamforming structure in aspects of Transceiver Unit (TXRU) and physical antenna.

FIG. 4 abstractly shows a hybrid beamforming structure in aspects of Transceiver Unit (TXRU) and physical antenna.

When a multitude of antennas are used, a hybrid beamforming scheme of combining a digital beamforming and an analog beamforming together is on the rise. Here, the analog beamforming (or an RF beamforming) means an operation that an RF unit performs precoding (or combining). In the hybrid beamforming, each of a baseband unit and an RF unit performs a precoding (or combining), whereby performance proximate to the digital beamforming can be advantageously obtained while the number of RF chains and the number of D/A (or A/D) converters are reduced. For clarity, a hybrid beamforming structure may be represented as N TXRUs and M physical antennas. A digital beamforming for L data layers to be transmitted from a transmitting end may be represented as an N-by-L matrix. Thereafter, the N converted digital signals are converted into an analog signal through TXRU and an analog beamforming represented as an M-by-N matrix is then applied thereto.

In FIG. 4, the number of digital beams is L and the number of analog beams is N. In an NR system, a BS is designed to change an analog beamforming in a symbol unit, whereby a direction of supporting an efficient beamforming for a UE located in a specific area is considered. Moreover, when N TXRUs and M RF antennas are defined as a single antenna panel, an NR system considers a scheme of employing a plurality of antenna panels to which independent hybrid beamforming is applicable.

When a BS uses a plurality of analog beams, an analog beam advantageous for signal reception may differ per UE. Hence, regarding a synchronization signal, system information, paging and the like at least, a beam sweeping operation is considered as follows. Namely, a BS changes a plurality of analog beams, which are to be applied in a specific slot or SubFrame (SF), per symbol, whereby all UEs may have opportunity in receiving a signal.

Figure 5:
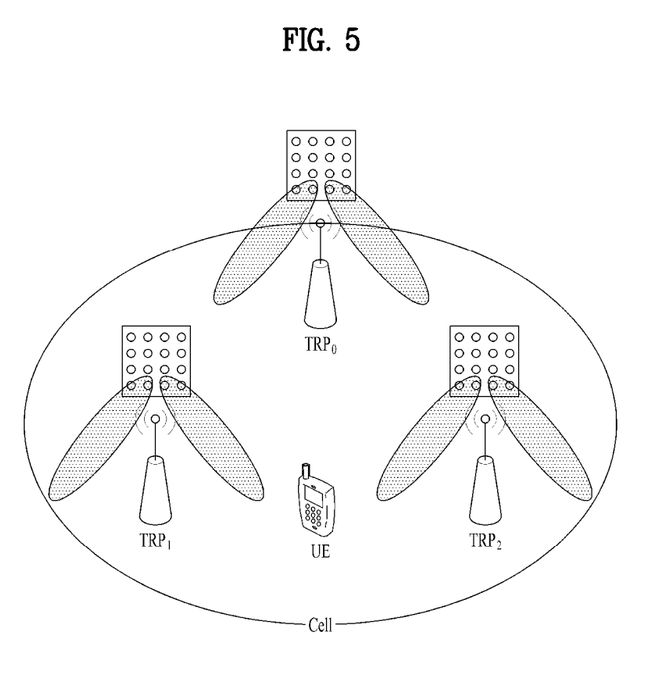
FIG. 5 shows an exemplary cell of a New Radio access technology (NR) system.

FIG. 5 shows an exemplary cell of a New Radio access technology (NR) system.

Referring to FIG. 5, in a NR system, unlike that one BS forms one cell in a wireless communication system such as the existing LTE or the like, a scheme that a plurality of Transmission Reception Points (TRPs) form one cell is under discussion. If a plurality of TRPs form one cell, although a RTP that services a UE is changed, seamless communication is possible. Hence, mobility management of a UE is advantageously facilitated.

In the LTE/LTE-A system, PSS/SSS is transmitted in omni-directions. Unlike this, in the NR system, a following method is considered. Namely, a gNB applying mmWave performs a beamforming on a signal such as PSS, SSS, PBCH or the like by turning a direction of a beam omni-directionally and then transmits the corresponding signal. In doing so, transceiving a signal by turning a beam direction is referred to as a beam sweeping or a beam scanning. In the present disclosure, 'beam sweeping' indicates an operation of a transmitter side and 'beam scanning' indicates an operation of a receiver side. For example, assuming that a gNB is capable of having maximum N beam directions, the gNB transmits signals of PSS/SSS/PBCH and the like in the N beam directions, respectively. Namely, the gNB transmits synchronization signals of PSS/SSS/PBCH and the like in the respective directions. Or, if the gNB is capable of forming N beams, a plurality of beams can be bundled into a single beam group and PSS/SSS/PBCH may be transceived per beam group. In this case, one beam group includes one or more beams. A signal of PSS/SSS/PBCH or the like transmitted in the same direction may be defined as one SS block and a plurality of SS blocks may exist within a cell. In case that a plurality of SS blocks exist, an SS block index may be used to identify each SS block. For example, when PSS/SSS/PBCH is transmitted in 10 beam directions in a single system, PSS/SSS/PBCH in the same direction may configure one SS block and 10 SS blocks may be understood as existing in the corresponding system.

Figure 6:
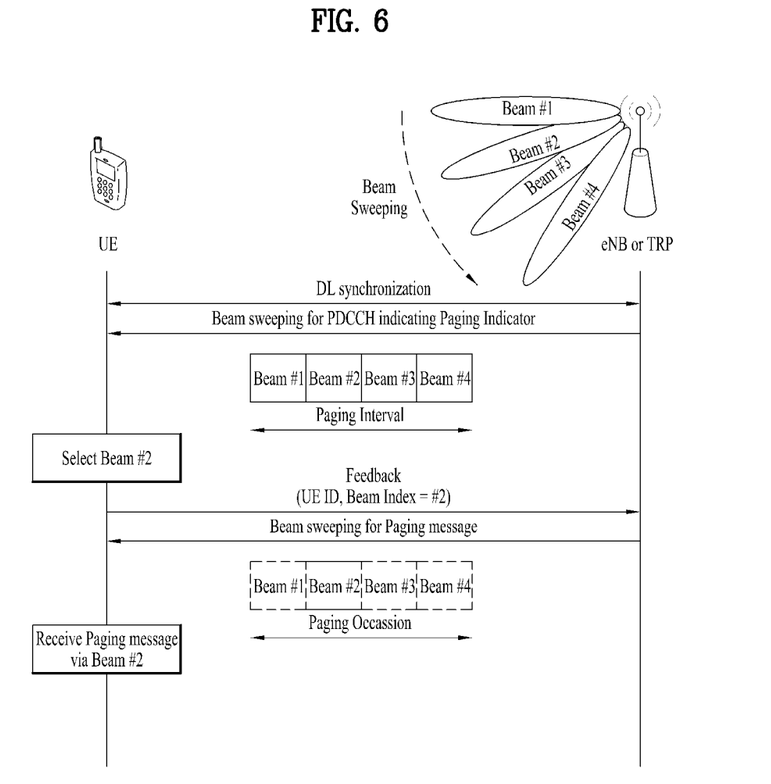
FIG. 6 shows an example that a UE receives a paging channel transmitted from a base station by a beam sweeping operation.

FIG. 6 shows an example that a UE receives a paging channel transmitted from a base station by a beam sweeping operation.

In a cellular communication system, various channels (e.g., a paging channel) used for the purpose of delivering system information or forwarding data to a UE in an idle state are defined. And, such channels are transmitted as a broadcast type so as to be received by a UE located on a cell boundary.

Moreover, in case of an mmW band, since transmission is made by performing beamforming spatially, a beam sweeping is performed to secure the coverage in terms of a space. Hence, a BS may transmit a broadcast channel by performing a beam sweeping and a UE may receive the broadcast channel transmitted by the beam sweeping.

In case of a paging channel as one example of a broadcast channel, a transmission time of the paging channel is predefined to raise power efficiency of a UE in idle state and the predefined transmission time of the paging channel may be referred to as a paging occasion. Hence, the UE enters a sleep mode in a time other than the paging occasion if possible. Namely, if entering the idle state, the UE cuts off the power of all the possible modules, enters the sleep mode, and receives a paging channel by waking up on the paging occasion configured by a BS. The BS transmits the paging channel in all beam directions on the paging occasion by performing a beam sweeping. In particular, on the paging occasion, the BS transmits DCI indication information of a frequency resource on PDSCH and PDSCH for transmitting the paging channel.

In the following, with reference to FIG. 6, a process for a BS to transmit a paging channel by performing a beam sweeping and a process for a UE to receive the paging channel are described in detail.

A UE monitors a first section in which a paging indicator is repeatedly transmitted through a plurality of beams, and selects a beam having a best quality or a quality equal to or higher than a threshold level from a plurality of the beams. If the paging indicator makes a request for feedback to the UE in the first section (e.g., a paging interval), the UE transmits the feedback indicating the selected beam in a second period. Here, the transmitted feedback may be transmitted through the selected beam. Thereafter, the UE monitors a third period (e.g., a paging occasion) to obtain a paging message.

Referring to FIG. 6, a UE performs DownLink (DL) synchronization on a TRP or a cell of a BS. The UE receives at least one of a Master Information Block (MIB) and a System Information Block (SIB) from the BS.

To receive a paging indicator or a paging message, the UE calculates a paging interval in which a paging channel should be monitored. And, the paging interval may be calculated based on ID of the UE. Here, the paging interval may include a paging occasion, a paging time window, or a paging frame. Or, the paging interval may include a paging hyper frame calculated based on at least one of an ID of the UE and a selected beam index. The paging indicator may include an RNTI such as a Paging-Radio Network Temporary Identifier (P-RNTI) on PDCCH. The paging message is transmitted on PDSCH.

Moreover, referring to FIG. 6, the BS transmits a plurality of beams in a paging interval for sweeping an antenna beam entirely or in part. Different beams may be transmitted in different time periods (e.g., a subframe or symbol including a Beam Reference Signal (BRS)), respectively. A plurality of the transmitted beams carry a paging indicator indicating a group of UEs, a group of UE IDs, a specific-type UE (e.g., delay tolerant devices, vehicular UEs), a specific UE category, a specific service, and a service group. Moreover, the paging indicator may indicate whether a prescribed beam index can be included in feedback.

The UE receives different beams in different time periods, respectively, thereby measuring a quality of each beam. Regarding a beam, a beam having the highest measured quality may be selected from all beams. Or, according to an embodiment, the UE may select one or more beams having a measured quality equal to or higher than a threshold level or a measured quality not lower than the threshold level.

If a paging indicator is received on a monitored paging occasion and/or the corresponding paging indicator corresponds to the UE, the UE transmits feedback to the BS. Here, the feedback indicates a beam index of the selected beam and may be transmitted according one of the three kinds of options in the following.

(1) First option: a random access preamble, a random access preamble set or a random access resource indicates a selected beam. Mapping between the random access preamble, the random access preamble set or the random access resource and a beam is signaled to the UE from the BS through system information.

(2) Second option: feedback is a MAC control element including a selected beam index and a UE ID of the UE.

(3) Third option: feedback is an RRC message including a selected beam index and a UE ID of the UE. The RRC message may be sent during an RRC connection establishment procedure, an RRC connection resume procedure, an RRC connection re-establishment procedure or an RRC call update procedure. The RRC message may include an RRC connection request message, an RRC connection re-establishment request message, an RRC connection resume request message, or a call update message.

The UE may start a timer after transmitting the feedback. The UE may receive a timer value from the BS through system information.

After receiving the feedback including the beam index of the selected beam, the BS sends a paging message through the selected beam on the paging occasion. Here, the paging occasion may be calculated based on at least one of the UE ID and the beam index.

For a specific period after sending the feedback, the UE monitors the selected beam only on the whole or portion of the paging occasion in which the selected beam is transmitted. Namely, the UE monitors the selected beam only until the timer expires. If the paging message including the ID of the UE is not received for the aforementioned specific period (i.e., if the paging message including the ID of the UE is not received until the timer expires), the UE monitors all the beams in the paging intervals or on the paging occasion.

According to the existing LTE/LTE-A or NR system, in case of a paging channel, retransmission is not performed. Hence, in case of a broadcast channel including a paging channel, in order to service all areas supported by a BS with a single transmission, relatively more resources may be allocated for one slot to raise transmission energy. In this case, as many resources within a slot are allocated to one channel, it may cause a problem that a scheduling flexibility of the BS is restricted. Hence, in order to enhance the coverage of the broadcast channel, delivery through repetitive transmission in form like the Hybrid Automatic Repeat Request (HARQ) may be efficient.

For example, in case of a paging channel, if failing in receiving the paging channel, the UE re-attempts a reception of a paging channel on a next paging occasion. As the UE fails in the reception of the paging channel, if the UE re-attempts the reception of the paging channel on the next paging occasion, a time delay may occur in receiving the paging channel Hence, in order to prevent the delay due to the reception of the paging channel, if a system determines that the coverage of the paging channel is insufficient, it is necessary to define HARQ retransmission for the paging channel. By determining the HARQ retransmission for the paging channel, the time delay for call setup may be reduced.

Yet, in case of an mmW band, as shown in FIG. 6, since transmission is made by performing a beamforming spatially, a beam sweeping is performed to secure coverage in terms of a space. In case of an analog beamforming, since a direction of a beam is set equal for all bands serviced by one RF module in a BS, a beam sweeping of a broadcast channel may restrict the scheduling flexibility of the BS. Hence, when a broadcast channel is transmitted by performing a beam sweeping, in case of performing HARQ retransmission to enhance the coverage of the broadcast channel, the scheduling flexibility of the BS may be further restricted due to the beam sweeping.

Therefore, according to the present disclosure, in a multi-beam environment, in order to extend the cove rage of a paging channel, a method of retransmitting the paging channel and receiving the retransmitted paging channel is defined. And, according to the present disclosure, proposed is a method of improving a scheduling flexibility of a BS despite retransmitting a paging channel not by retransmitting the paging channel at a predefined location but by performing a DCI-based HARQ retransmission.

As the simplest method of defining an HARQ retransmission for a paging channel, a method of performing a retransmission on an occasion designated to an initial transmission may be considered like pre-designating a transmission occasion of the initial transmission. Considering scheduling overhead, retransmission at a designated location may be the most effective method for a single beam. Yet, as described above, since a BS transmits a broadcast channel by performing a beam sweeping in a multi-beam environment, if a retransmission occasion is fixed for an initial transmission occasion, a scheduling flexibility of the BS is restricted disadvantageously. Moreover, in case that a retransmission of a broadcast channel (e.g., a paging channel) should be performed, as a UE has already woken up on a paging occasion, a retransmission occasion of the broadcast channel does not need to be fixed in advance. Therefore, the present disclosure proposes a method of indicating a retransmission occasion through DCI despite that an initial transmission occasion of a broadcast channel is pre-defined.

In this case, the UE is incapable of knowing exactly whether the retransmission is performed persistently. Hence, the UE configures a time duration for performing a retransmission for an initial transmission occasion (or, an initial transmission appointed occasion if the initial transmission occasion is not appointed accurately). And, if there is no retransmission for the configured time duration, the UE regards a BS as not attempting further retransmission and stops the attempt on the retransmission reception. For clarity of the following description, a time duration in which a retransmission can be performed is referred to as a time duration for retransmission.

The BS should configure a time duration for retransmission and a maximum retransmission number of retransmissions that can be performed for the time duration for the retransmission. Although a time duration for retransmission is configured, if the UE succeeds in receiving a reception of a paging channel for the configured time duration, the UE performs call set-up immediately. Moreover, if a paging message supposed to be received by the UE does not exist in the whole message received from the BS, the UE enters a sleep mode immediately.

Yet, as the UE fails in the reception of the broadcast channel, although the UE reattempts the reception of the broadcast channel as many times as the maximum retransmission number within the time duration for the retransmission, if the UE fails, the UE does not attempt the reception of the broadcast channel any further but enters a sleep mode.

Moreover, although the time duration for the retransmission and the maximum retransmission number are configured, after the BS has sent a broadcast message a prescribed number of times, the BS may determine not to send the broadcast message any more due to excessive traffic loads in a BS area. In this case, the BS may indicate that there is no more retransmission of a broadcast message through DCI for a transmission of the broadcast message. Hence, having received the DCI and failed in reception of the broadcast message, the UE may be aware that there is no more retransmission of the broadcast message from the BS and does not attempt a reception for the retransmission of the broadcast message any more. Moreover, since the UE having failed in the reception of the DCI on the retransmission for the configured time duration is unable to obtain information on the maximum retransmission number, if the UE arrives at the time duration for the retransmission, the UE enters a sleep mode without attempting the reception of the broadcast channel any more.

In case of general downlink, a BS transmits a DCI and a data channel simultaneously. Yet, if necessary, the BS may transmit a data channel after k slot(s) from an occasion on which a UE receives the DCI. In doing so, the BS informs the UE of a transmission beam of the data channel transmitted after the k slot(s), thereby helping the UE receive the data channel. Here, the k may be predefined, set by the BS, or configured dynamically through the DCI. Hence, the BS may resolve the scheduling restriction due to the retransmission of a broadcast channel in a multi-beam environment. According to an embodiment, a BS does not transmit a broadcast channel on an initial transmission occasion but may transmit a broadcast channel through retransmission using the aforementioned method.

Moreover, according to an embodiment, the aforementioned method may be applied to an initial transmission. For example, if a transmission occasion of a broadcast channel is predefined, a UE persistently attempts a reception of the broadcast channel for a configured time duration despite failing in the reception of the broadcast channel on the defined transmission occasion. In this case, the UE checks whether the broadcast channel is actually transmitted through DCI and may attempt a reception of the broadcast channel. In the aforementioned case, since the UE is incapable of attempting the reception continuously, the BS defines a transmission occasion of a broadcast channel and configures a time duration for which the UE attempts the reception of the broadcast channel. And, for the efficient scheduling, the BS may transmit a broadcast channel on an appropriate occasion within the configured time duration.

Meanwhile, since UEs for which UE-dedicated channel is not established attempt reception of a broadcast channel, a BS is unable to know whether all UEs receive the broadcast channel successfully. Hence, the BS randomly performs retransmission for coverage enhancement as many times as the number configured by the BS. In this case, if a UE does not exist on a cell boundary or area, resources may be wasted due to unnecessary retransmission. Hence, according to an embodiment, the BS may configure a feedback channel for a broadcast channel.

Since UEs in idle state attempt reception of a feedback channel, a BS may allocate a single resource only for a broadcast channel instead of allocating a UE-dedicated resource. In this case, in case of multiple beams, the BS allocates a single resource per beam. As excessive UEs transmit a feedback channel on the single resource, if inter-cell interference increases excessively, the BS may allocate a plurality of resources. And, a UE may transmit a feedback channel by ON/OFF keying. For example, a UE succeeding in reception of a broadcast channel does not transmit any signal. On the contrary, a UE failing in reception of a broadcast channel despite attempting the reception may transmit a signal determined with a transmission power based on a power control scheme determined for an allocated resource.

In this case, a signal transmitted on a feedback channel may be defined as a single sequence. Or, in order to prevent the convergence into 0 due to a plurality of users overlapping over the same sequence, a plurality of sequences are defined and a signal may be transmitted with a sequence randomly selected by a UE from a plurality of sequence candidates.

A UE located near a cell has very low probability of reception of a broadcast channel. Hence, a BS may restrict signal transmission of a UE having a reception quality equal to or higher than a preset level or give a weight on a transmission power according to a reception quality of downlink.

Having transmitted a broadcast channel, a BS measures a size of a reception power of a signal preset for an allocated uplink resource. And, if the measured size of the reception power is equal to or greater than a threshold, the BS recognizes that there is a UE failing in the reception of the broadcast channel and may perform a retransmission of the broadcast channel Here, the threshold may be set different according to a retransmission number.

A signal for feedback is defined as a signal different between cells at least, whereby a signal transmitted to another cell should be identified at a boundary point of a cell. Moreover, like a UE in idle state, since a signal is transmitted in a state that timing alignment for uplink is not performed, a signal for feedback should be defined as a signal including a CP or GP that reflects a cell radius like RACH.

Figure 7:
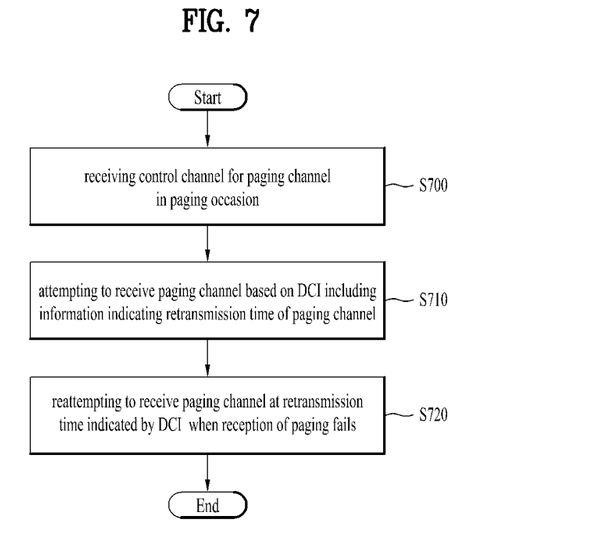
FIG. 7 is a flowchart showing a method that a UE and a base station transceive a paging channel according to the present disclosure.

FIG. 7 is a flowchart showing a method that a UE and a base station transceive a paging channel according to the present disclosure.

Referring to FIG. 7, in a step S700, a UE may receive a control channel for a paging channel on a paging occasion of the UE. The UE wakes up on the paging occasion of the UE and then monitors PDCCH as the control channel for the paging channel. The UE may attempt a reception of the paging channel depending on a presence or non-presence of the paging channel. For example, the UE checks whether a paging indicator indicating that the paging channel the UE will receive is included in PDCCH, thereby checking a presence or non-presence of the paging channel. If the paging indicator is included in PDCCH, the UE may attempt the reception of the paging channel.

In a step S710, the UE attempts the reception of the paging channel based on Downlink Control Information (DCI) including information indicating a retransmission occasion of the paging channel. In order to enhance the coverage of the paging channel, the paging channel may be retransmitted from a BS. In this case, in order to improve a scheduling flexibility of the BS, the retransmission occasion of the paging channel may be indicated by the DCI. Moreover, the DCI may indicate information of a frequency resource for PDSCH on which the paging channel is transmitted. Hence, the UE may attempt the reception of the paging channel based on the DCI. The paging channel and the DCI may be transmitted on the same occasion. Alternatively, after a prescribed time from a DCI transmitted occasion, the paging channel may be transmitted. If the paging channel is transmitted after the DCI has been transmitted, the BS may inform the UE of a beam carrying the paging channel among a plurality of beams through the DCI.

In a step S720, if the UE fails in the reception of the paging channel, the UE may reattempt the reception of the paging channel on the retransmission occasion indicated by the DCI. Here, a content delivered through the reception-reattempted paging channel is identical to a content delivered through the initial reception-attempted paging channel. And, a type of a symbol of the reception-reattempted paging channel may be the same as the initial reception-attempted paging channel or differ from that of the initial reception-attempted paging channel in an Incremental Redundancy (IR) version, by which the present disclosure is non-limited.

If the UE succeeds in the reception of the paging channel, the UE performs a call setup procedure. Yet, if the UE does not succeed in the reception of the paging channel until a preset time duration for the retransmission and a maximum retransmission number are exceeded, the UE may stop reattempting the reception of the paging channel and enter a sleep mode.

In case of a paging channel retransmitted by the BS, it is unnecessary to be transmitted on a predefined occasion unlike an initially transmitted paging channel. Hence, the BS delivers the retransmission occasion of the paging channel to the UE through the DCI and retransmits the paging channel on the occasion delivered through the DCI, whereby a scheduling flexibility of the BS can be improved.

Figure 8:
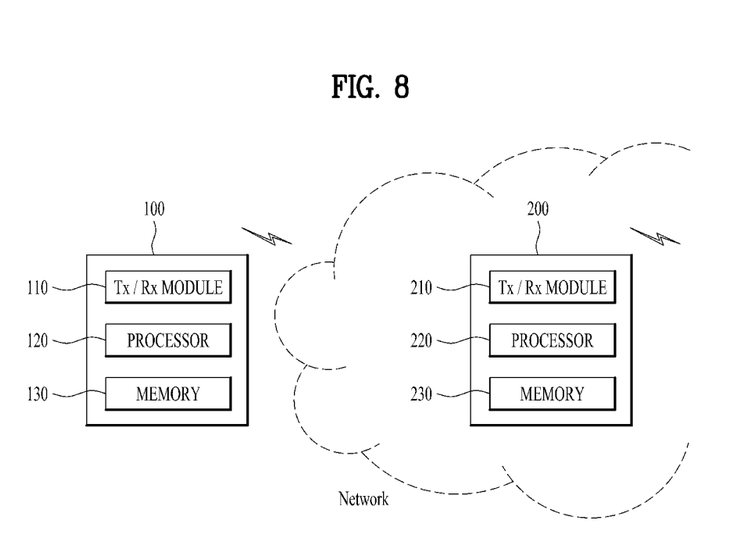
FIG. 8 is a diagram showing configurations of a UE and base station applied to the proposal of the present disclosure.

FIG. 9 is a diagram showing configurations of a UE and base station applied to the proposal of the present disclosure.

A User Equipment (UE) 100 according to a proposed embodiment may include a transceiver 110, a processor 120 and a memory 130. The transceiver 110 of the UE 100 may be referred to as a Radio Frequency (RF) unit or a transceiving module. The transceiver 110 may be configured to transmit various signals, data and information to an external device and receive various signals, data and information from the external device. Or, the transceiver 110 may be implemented in a manner of being separated into a transmitting unit and a receiving unit. The UE 100 may be connected to an external device by wire and/or wireless. The processor 120 may control overall operations of the UE 100 and may be configured to perform a function of processing an operation of information transceived with an external device by the UE 100. And, the processor 120 may be configured to perform an operation of the UE 100 proposed in the present disclosure. The processor 120 may control the transceiver 110 to transmit data or a message according to the proposal of the present disclosure. The memory 130 may store the operation-processed information and the like for a prescribed time. And, the memory 130 may be substituted with a component such as a buffer (not shown) or the like.

Referring to FIG. 9, a Base Station (BS) 200 according to a proposed embodiment may include a Transmitting/Receiving (Tx/Rx) module 210, a processor 220 and a memory 230. The Tx/Rx module may be referred to as a transceiver. In case of communicating with the UE 100, the Tx/Rx module 210 may be referred to as a Radio Frequency (RF) unit. The Tx/Rx module 210 may be configured to transmit various signals, data and information to an external device and receive various signals, data and information from the external device. The BS 200 may be connected to an external device by wire and/or wireless. The Tx/Rx module 2100 may be implemented in a manner of being separated into a transmitting unit and a receiving unit. The processor 220 may control overall operations of the BS 200 and may be configured to perform a function of processing an operation of information to be transceived with an external device by the BS 200. And, the processor 220 may be configured to perform an operation of the BS 200 proposed in the present disclosure. The processor 120 may control the Tx/Rx module 210 to transmit data or a message to the UE 100 or another BS according to the proposal of the present disclosure. The memory 230 may store the operation-processed information and the like for a prescribed time. And, the memory 230 may be substituted with a component such as a buffer (not shown) or the like. On a connected network, the BS 200 may include an eNB or a gNB.

Moreover, the above detailed configurations of the UE 100 and the BS 200 may be implemented in a manner that the matters described in various embodiments of the present disclosure are applied independently or that two or more embodiments are applied simultaneously. And, the description of the redundant contents shall be omitted for clarity.

The processor 120 of the UE 100 according to the present disclosure may control the transceiver 110 to receive a control channel for a paging channel on a paging occasion of the UE 100, attempt a repletion of the paging channel based on Downlink Control Information (DCI) including information indicating a retransmission occasion of the paging channel, and reattempt the reception of the paging channel on a retransmission occasion indicated by the DCI in case of failing in the reception of the paging channel.

In this case, the processor 120 of the UE 100 may control the transceiver to reattempt the reception of the paging channel within a maximum retransmission number for a time duration for retransmission configured by the BS until succeeding in the reception of the paging channel. If succeeding in the reception of the paging channel before exceeding the time duration for the retransmission and the maximum retransmission number, the processor 120 of the UE 100 may control a call setup procedure to be executed. On the contrary, if failing in the attempt on the reception of the paging channel, which was performed as many times as the maximum retransmission number, the processor 120 stops attempting the reception of the paging channel and controls the UE 100 to enter a sleep mode. If receiving DCI indicating that the paging channel will not be transmitted any more even before the time duration for the retransmission and the maximum retransmission number are exceeded, the processor 120 may control the transceiver 110 to stop attempting the reception of the paging channel based on the received DCI.

Moreover, according to an embodiment, the processor 120 may control the transceiver 110 to transmit feedback information indicating a success or failure in the reception of the paging channel to the BS 200. For example, if failing in the reception of the paging channel, the processor 120 may control the transceiver 110 to transmit a predefined signal. Yet, if succeeding in the reception of the paging channel, the predefined signal is not transmitted.

The processor 220 of the BS 200 according to the present disclosure may control the transceiver 210 to transmit a control channel for a paging channel on a paging occasion of the UE 100, transmit DCI including information indicating a retransmission occasion of the paging channel, and retransmit the paging channel on the retransmission occasion indicated by the DCI.

The aforementioned embodiments of the present disclosure may be implemented through various means. For example, embodiments of the present disclosure may be implemented by hardware, firmware, software, combination thereof or the like.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

As mentioned in the foregoing description, the detailed descriptions for the preferred embodiments of the present disclosure are provided to be implemented by those skilled in the art. While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents. For instance, the respective configurations disclosed in the aforesaid embodiments of the present disclosure can be used by those skilled in the art in a manner of being combined with one another. Therefore, the present disclosure is non-limited by the embodiments disclosed herein but intends to give a broadest scope matching the principles and new features disclosed herein.

INDUSTRIAL APPLICABILITY

The aforementioned communication method is applicable to various wireless communication systems including IEEE 802.16x system and IEEE 802.11x system as well as 3GPP system. Furthermore, the proposed method is applicable to an mmWave communication system using an ultrahigh frequency band as well.

What is claimed is:
1. A method of receiving a paging channel by a User Equipment (UE) in a wireless communication system, the method comprising:
  receiving a control channel for the paging channel on a paging occasion of the UE;
  attempting a reception of the paging channel based on Downlink Control Information (DCI) including information indicating a retransmission occasion of the paging channel;
  based on the UE failing to receive the paging channel during the attempt to receive the paging channel, reattempting reception of the paging channel, on the retransmission occasion indicated by the DCI, a number of times until reception of the paging channel is successful or until a maximum number retransmissions during a time duration for retransmission has occurred without successful reception of the paging channel;
  based on the maximum number of retransmissions occurring without successful reception of the paging channel, receiving additional DCI, prior to the end of the time duration for retransmission, indicating that the paging channel will not be retransmitted anymore and that the maximum number of retransmissions has occurred; and
  stopping the paging channel reception attempts based on the received, additional DCI.

2. The method of claim 1 further comprising:
entering a sleep mode based on the maximum number of retransmissions occurring without successful reception of the paging channel.

3. The method of claim 1, further comprising:
transmitting a predefined signal based on the maximum number of retransmissions occurring without successful reception of the paging channel, wherein when the reception of the paging channel is successful, the predefined signal is not transmitted.

4. A method of transmitting a paging channel to a User Equipment (UE) by a base station in a wireless communication system, the method comprising:
transmitting a control channel for the paging channel on a paging occasion of the UE;
transmitting Downlink Control Information (DCI) including information indicating a retransmission occasion of the paging channel and the paging channel; and
retransmitting the paging channel, on the retransmission occasion indicated by the DCI, no more than a maximum number of retransmissions for a time duration for retransmission;
transmitting additional DCI indicating that the paging channel will not be retransmitted anymore to the UE, based on a traffic amount of the base station, before the end of the time duration for retransmission and the maximum number of retransmissions has occurred.

5. The method of claim 4, further comprising:
receiving a predefined signal indicating that the UE has successfully received the paging channel.

6. A User Equipment (UE) receiving a paging channel in a wireless communication system, the UE comprising:
a transceiver; and
a processor controlling the transceiver to receive a control channel for the paging channel on a paging occasion of the UE,
attempt a reception of the paging channel based on Downlink Control Information (DCI) including information indicating a retransmission occasion of the paging channel,
based on the processor failing to receive the paging channel during the attempt to receive the paging channel, reattempt reception of the paging channel, on the retransmission occasion indicated by the DCI, a number of times until reception of the paging channel is successful or until a maximum number retransmissions during a time duration for retransmission has occurred without successful reception of the paging channel,
based on the maximum number of retransmissions occurring without successful reception of the paging channel, receive additional DCL prior to the end of the time duration for retransmission, indicating that the paging channel will not be retransmitted anymore and that the maximum number of retransmissions has occurred; and
stop the paging channel reception attempts based on the received, additional DCI.

7. The UE of claim 6, wherein the processor controls the UE to enter a sleep mode based on the maximum number of retransmissions occurring without successful reception of the paging channel.

8. The UE of claim 6, wherein the processor further controls the transceiver to transmit a predefined signal based on the maximum number of retransmissions occurring without successful reception of the paging channel and wherein when the reception of the paging channel is successful, the processor controls the transceiver to not transmit the predefined signal.

9. A base station transmitting a paging channel to a User Equipment (UE) in a wireless communication system, the base station comprising:
a transceiver; and
a processor controlling the transceiver to transmit a control channel for the paging channel on a paging occasion of the UE,
transmit Downlink Control Information (DCI) including information indicating a retransmission occasion of the paging channel and the paging channel,
retransmit the paging channel, on the retransmission occasion indicated by the DCI, no more than a maximum number of retransmissions for a time duration for retransmission, and
transmit additional DCI indicating that the paging channel will not be retransmitted anymore to the UE, based on a traffic amount of the base station, before the end of the time duration for retransmission and that the maximum number of retransmissions has occurred.

10. The base station of claim 9, wherein the processor controls the transceiver to receive a predefined signal indicating that the UE has successfully received the paging channel.

* * * * *